(12) United States Patent
Kowalczyk et al.

(10) Patent No.: US 10,133,019 B2
(45) Date of Patent: Nov. 20, 2018

(54) TELECOMMUNICATIONS CONNECTION DEVICE

(71) Applicant: CommScope Technologies LLC, Hickory, NC (US)

(72) Inventors: Scott C. Kowalczyk, Savage, MN (US); Steven C. Zimmel, Minneapolis, MN (US); James J. Brandt, St. Louis Park, MN (US); Oscar Fernando Bran De Leon, Belle Plaine, MN (US); Erik J. Gronvall, Bloomington, MN (US); Trevor D. Smith, Eden Prairie, MN (US); Yu Lu, Eden Prairie, MN (US); David J. Anderson, Bloomington, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 15/723,876

(22) Filed: Oct. 3, 2017

(65) Prior Publication Data

US 2018/0136425 A1 May 17, 2018

Related U.S. Application Data

(63) Continuation of application No. 14/896,394, filed as application No. PCT/US2014/041533 on Jun. 9, 2014, now abandoned.
(Continued)

(51) Int. Cl.
*G02B 6/44* (2006.01)
*G02B 6/38* (2006.01)
*G02B 6/42* (2006.01)

(52) U.S. Cl.
CPC ......... *G02B 6/4471* (2013.01); *G02B 6/3887* (2013.01); *G02B 6/4285* (2013.01);
(Continued)

(58) Field of Classification Search
None
See application file for complete search history.

(56) References Cited

U.S. PATENT DOCUMENTS

| 5,125,060 A | 6/1992 | Edmundson |
| 5,966,489 A | 10/1999 | Harwell et al. |

(Continued)

FOREIGN PATENT DOCUMENTS

| CN | 201352702 Y | 11/2009 |
| DE | 100 08 613 A1 | 9/2001 |

(Continued)

OTHER PUBLICATIONS

International Search Report for International Application No. PCT/IB2014/060209 dated Jul. 23, 2014 (2 pages).
(Continued)

*Primary Examiner* — Jerry Rahll
(74) *Attorney, Agent, or Firm* — Merchant & Gould P.C.

(57) ABSTRACT

The present disclosure relates to a telecommunications connection device. The device including a housing, a plurality of single-fiber connectorized pigtails that extend outwardly from the housing and a multi-fiber connectorized pigtail that extends outwardly from the housing. The multi-fiber connectorized pigtail can be optically coupled with the single fiber connectorized pigtails. The device can include optical fibers routed from the multi-fiber connectorized pigtail through the housing to the single-fiber connectorized pigtails. The single-fiber connectorized pigtails can be more flexible than the multi-fiber connectorized pigtail.

19 Claims, 16 Drawing Sheets

Related U.S. Application Data

(60) Provisional application No. 61/832,621, filed on Jun. 7, 2013.

(52) U.S. Cl.
CPC ......... *G02B 6/4429* (2013.01); *G02B 6/4472* (2013.01); *G02B 6/3849* (2013.01); *G02B 6/3885* (2013.01); *G02B 6/3894* (2013.01); *G02B 6/4465* (2013.01)

(56) References Cited

U.S. PATENT DOCUMENTS

| | | | |
|---|---|---|---|
| 5,997,186 A | 12/1999 | Huynh et al. | |
| RE36,592 E | 2/2000 | Giebel | |
| 6,104,855 A | 8/2000 | Jeon | |
| 6,796,821 B2 | 9/2004 | Cairns et al. | |
| 7,277,614 B2 | 10/2007 | Cody et al. | |
| 7,428,366 B2 | 2/2008 | Mullaney et al. | |
| 7,409,127 B1 | 8/2008 | Hurley et al. | |
| 7,680,388 B2 | 3/2010 | Reagan et al. | |
| 7,686,519 B2 | 3/2010 | Lu | |
| 8,457,461 B2 | 6/2013 | Ott | |
| 8,472,767 B2 | 6/2013 | Easton et al. | |
| 8,532,490 B2 | 9/2013 | Smith et al. | |
| 8,842,954 B2 | 9/2014 | Burris et al. | |
| 8,948,557 B2 | 2/2015 | Islam | |
| 9,057,862 B2 | 6/2015 | Strasser et al. | |
| 9,069,151 B2 | 6/2015 | Conner | |
| 9,078,287 B2 | 7/2015 | Khemakhem et al. | |
| 9,182,564 B2 | 11/2015 | Strasser et al. | |
| 9,354,414 B2 | 5/2016 | Blackwell et al. | |
| 2005/0259928 A1 | 11/2005 | Elkins, II et al. | |
| 2006/0127026 A1 | 6/2006 | Beck | |
| 2006/0133758 A1 | 6/2006 | Mullaney et al. | |
| 2006/0147172 A1 | 7/2006 | Luther et al. | |
| 2006/0269208 A1 | 11/2006 | Allen et al. | |
| 2008/0112681 A1 | 5/2008 | Battey et al. | |
| 2008/0310796 A1 | 12/2008 | Lu | |
| 2009/0148101 A1 | 6/2009 | Lu et al. | |
| 2009/0269013 A1 | 10/2009 | Durand et al. | |
| 2009/0310929 A1 | 12/2009 | Reinhardt et al. | |
| 2010/0086260 A1 | 4/2010 | Parikh et al. | |
| 2010/0195970 A1 | 8/2010 | Mudd et al. | |
| 2011/0075968 A1 | 3/2011 | Cao et al. | |
| 2012/0057821 A1 | 3/2012 | Aronson et al. | |
| 2013/0294735 A1 | 11/2013 | Burris et al. | |
| 2014/0064671 A1 | 3/2014 | Barnette, Jr. et al. | |
| 2014/0219621 A1 | 8/2014 | Barnette, Jr. et al. | |
| 2015/0093084 A1* | 4/2015 | Cooke | G02B 6/4471 385/113 |
| 2016/0049782 A1 | 2/2016 | Strasser et al. | |
| 2017/0272168 A1 | 9/2017 | Smith et al. | |

FOREIGN PATENT DOCUMENTS

| | | |
|---|---|---|
| EP | 0 189 609 B1 | 5/1990 |
| EP | 2 253 980 A1 | 11/2010 |
| EP | 2 330 770 A1 | 6/2011 |
| EP | 2 619 617 A1 | 7/2013 |
| WO | 2006/113726 A1 | 10/2006 |
| WO | 2011/066363 A2 | 6/2011 |
| WO | 2014/123940 A1 | 8/2014 |
| WO | 2014/167447 A1 | 10/2014 |

OTHER PUBLICATIONS

International Written Opinion for International Application No. PCT/IB2014/060209 dated Jul. 23, 2014 (4 pages).
Extended European Search Report for corresponding European Patent Application No. 14808330.6 dated Apr. 11, 2017, 13 pages.
"Wireless infrastructure: Solutions for remote radios and cell sites", Huber & Suhner AG, Fiber Optics Division, 180 pages (2013).

\* cited by examiner

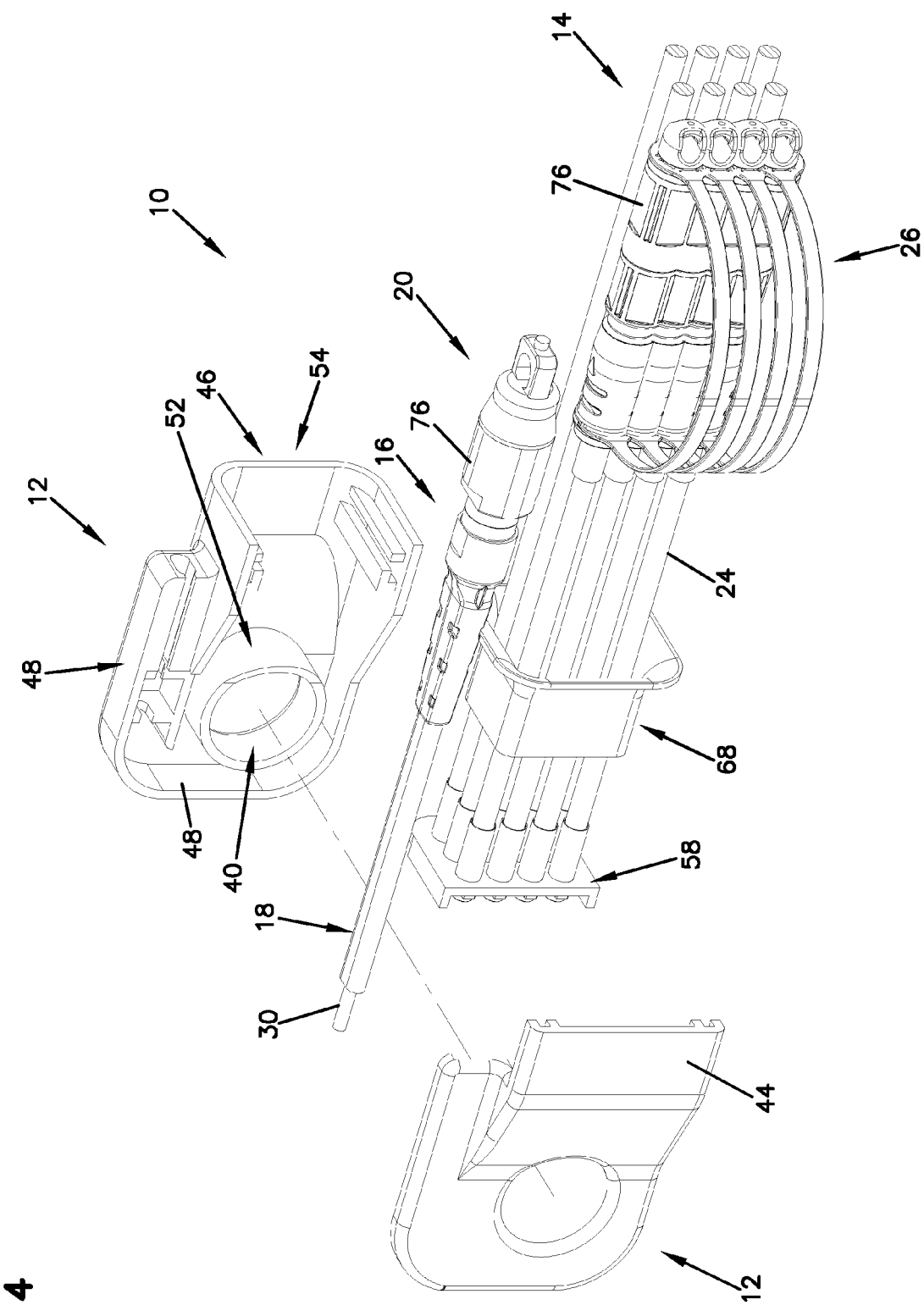

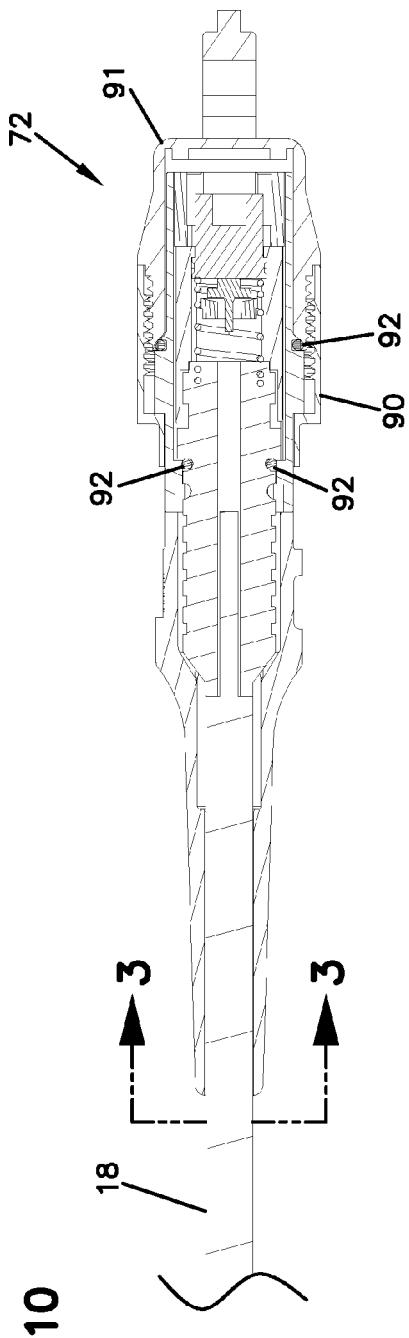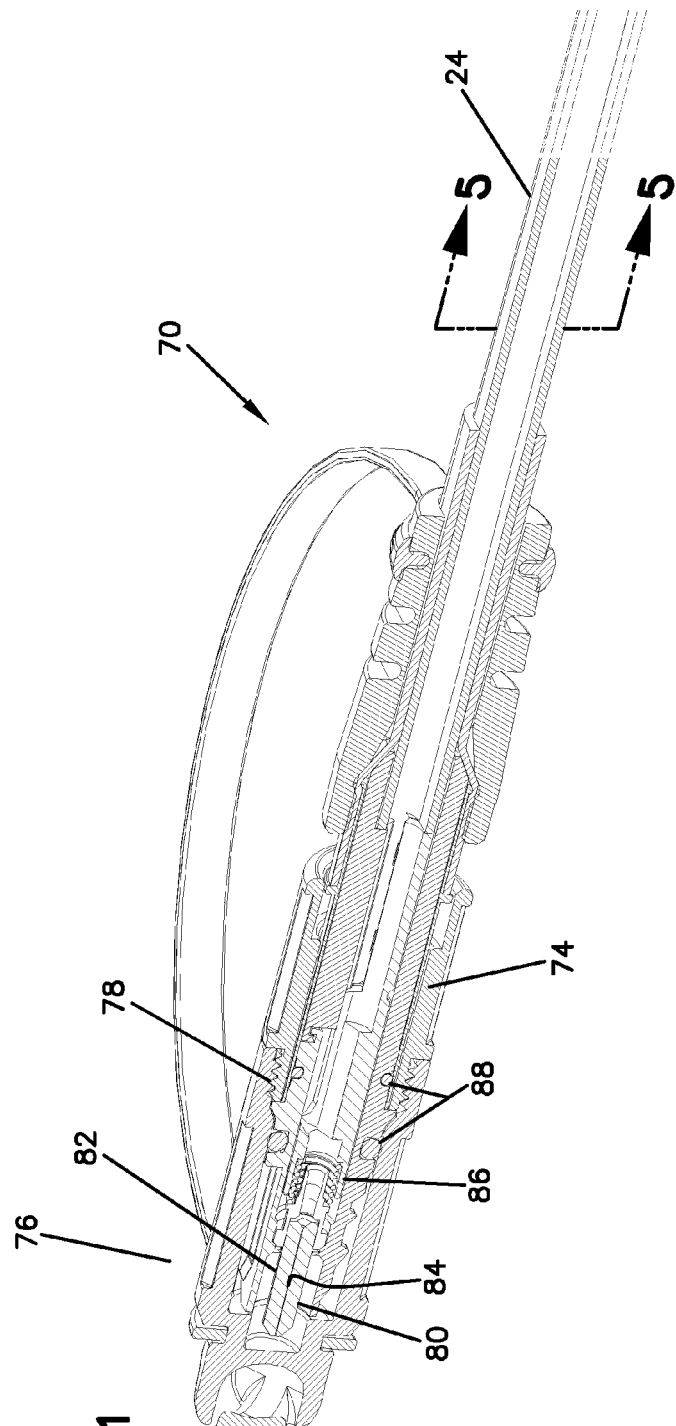
FIG. 10
FIG. 11

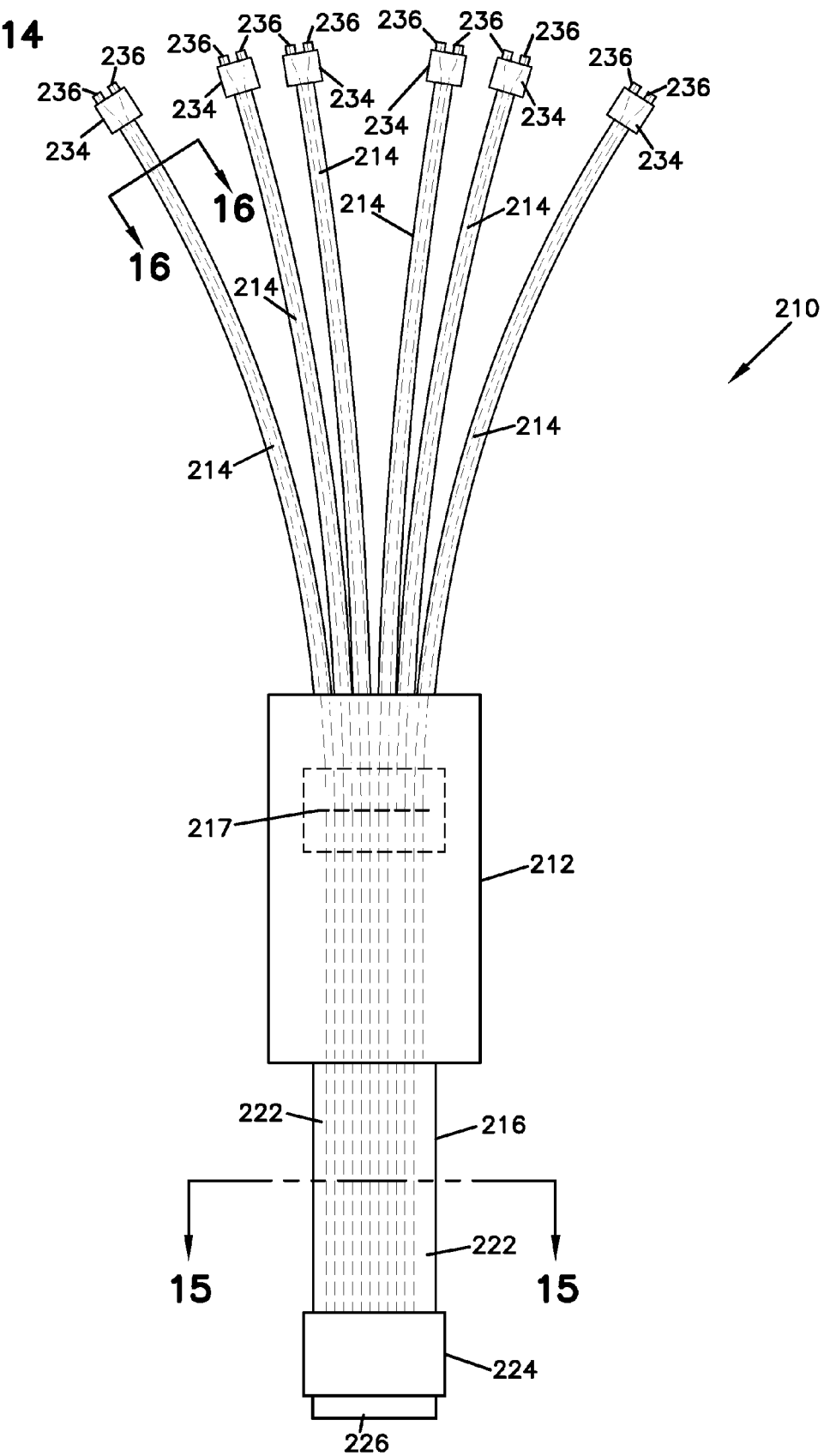

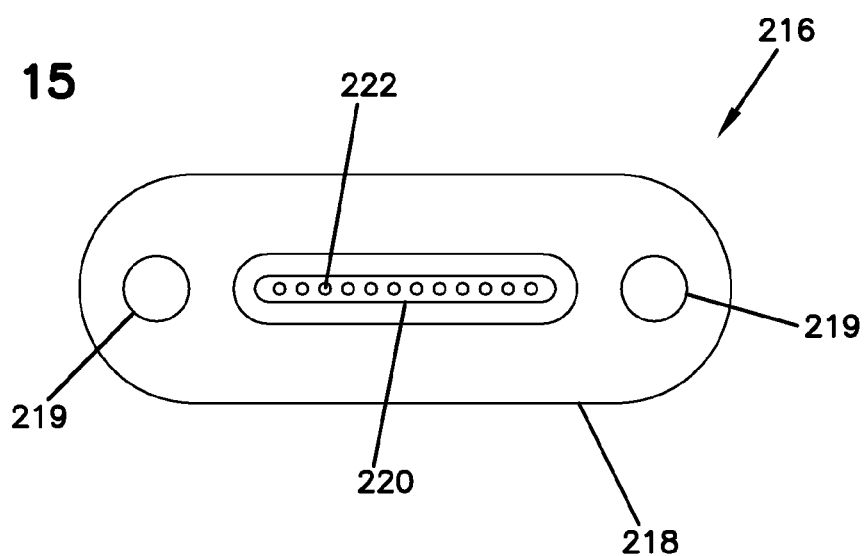
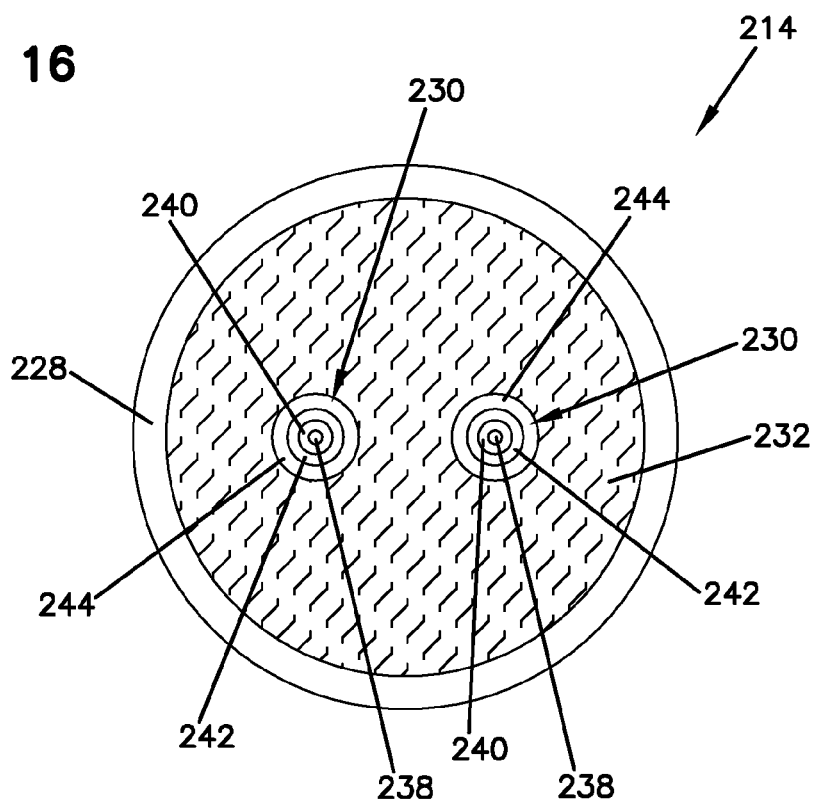

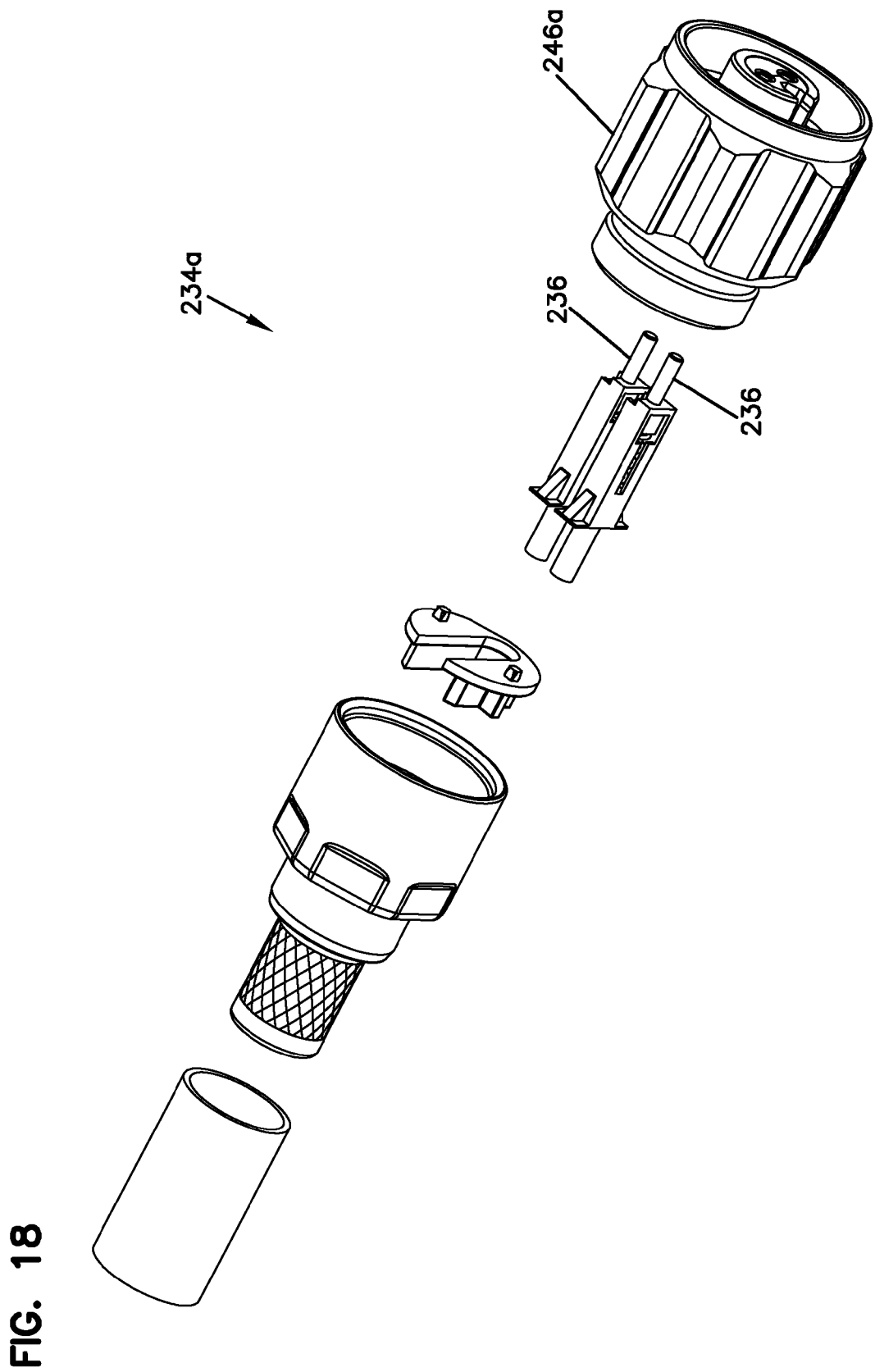

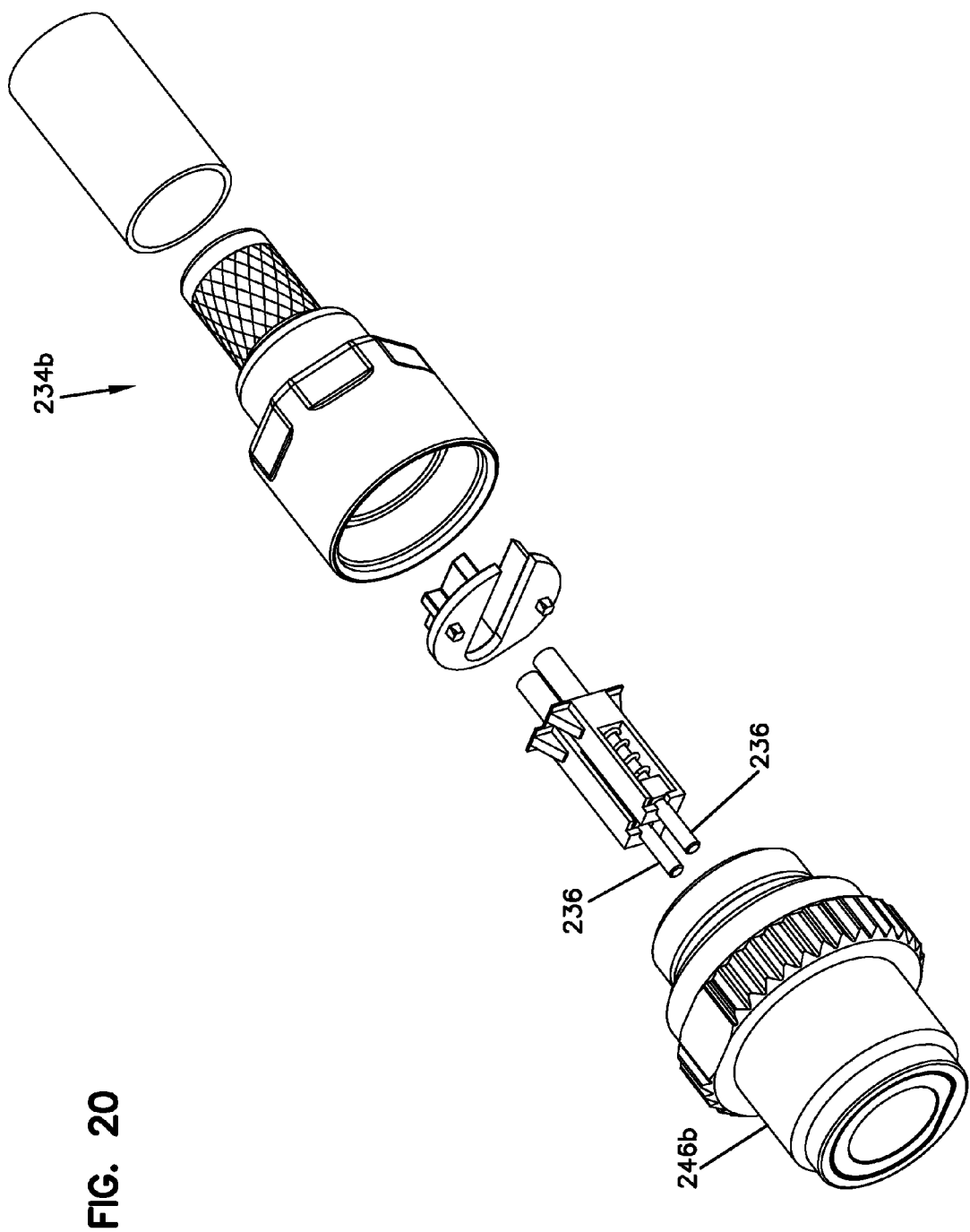

TELECOMMUNICATIONS CONNECTION DEVICE

CROSS-REFERENCE TO RELATED APPLICATIONS

This application is a Continuation of U.S. patent application Ser. No. 14/896,394, filed on Dec. 6, 2015, now abandoned, which is a National Stage of PCT International Patent Application No. PCT/US2014/041533, filed on Jun. 9, 2014, and claims the benefit of U.S. Patent Application Ser. No. 61/832,621 filed on Jun. 7, 2013, which applications are incorporated herein by reference. To the extent appropriate, a claim of priority is made to each of the above disclosed applications.

TECHNICAL FIELD

The present invention generally relates to telecommunications connection devices and terminal assemblies for extending fiber optic service.

BACKGROUND

Fiber optic telecommunications connectivity is being increased as part of Fiber-To-The-Household (FTTH) or Fiber-To-The-Premises (FTTP) efforts currently on-going. In these efforts to increase fiber connectivity, the household or small business customers may be less densely located than earlier fiber build-outs to larger businesses or industrial customers. These efforts have given rise to desires for different devices and approaches to extend fibers to these new customers.

Since the customers may be more widely spaced apart, it is desirable to have telecommunications connection devices that are configured to mount to a multi-strand fiber optic cable with from four to twelve fibers. These telecommunications connection devices aid in the break out of the individual fibers from the multi-strand cables and preparing them for connection to a customer service or drop cable. The nature and location of the connection with the customer drop cables can be below grade, at grade or aerial. It may be desirable that a telecommunications connection device be adapted for use in multiple locations so that the same terminal design may be used for multiple installations. For below grade and at grade installations, it may be desirable that a telecommunications connection device be adapted for pulling through an underground conduit. It may be desirable that the cable entry into and exit from the telecommunications connection device be sealed against environmental entry.

SUMMARY

The present disclosure relates to a telecommunications connection device including a housing, a plurality of single-fiber connectorized pigtails that extend outwardly from the housing and a multi-fiber connectorized pigtail that extends outwardly from the housing. The multi-fiber connectorized pigtail can be optically coupled with the single fiber connectorized pigtails. The housing can have a planform defining a planform area. The housing can define a through-hole that extends through the housing in a direction transverse to the planform area. The through-hole can define a through-hole area that is at least 5 percent as large as the planform area.

Another aspect of the disclosure includes a telecommunications connection device including a housing, a plurality of single-fiber connectorized pigtails that extend outwardly from the housing and a multi-fiber connectorized pigtail that extends outwardly from the housing. The multi-fiber connectorized pigtail can be optically coupled with the single fiber connectorized pigtails. The device can include optical fibers routed from the multi-fiber connectorized pigtail through the housing to the single-fiber connectorized pigtails. The single-fiber connectorized pigtails can be more flexible than the multi-fiber connectorized pigtail.

A further aspect of the disclosure includes a telecommunications connection device including a housing, a plurality of single-fiber connectorized pigtails that extend outwardly from the housing and a multi-fiber connectorized pigtail that extends outwardly from the housing. The multi-fiber connectorized pigtail can be optically coupled with the single fiber connectorized pigtails. The housing can define a through-hole that extends through the housing. The device further including optical fibers routed from the multi-fiber connectorized pigtail through the housing to the single-fiber connectorized pigtails. The optical fibers can be routed at least partially around the through-hole.

Another aspect of the disclosure can include a telecommunications connection device including a housing, a plurality of single-fiber connectorized pigtails that extend outwardly from the housing and a multi-fiber connectorized pigtail that extends outwardly from the housing. The multi-fiber connectorized pigtail can be optically coupled with the single fiber connectorized pigtails. The housing can define a through-hole that extends through the housing. The housing can have a major front side, a major back side, an exterior side wall that extends between the major front and rear sides and along an exterior boundary. The exterior boundary can define a planform of the housing and an interior wall that defines the through-hole and extends between the major front and back sides. Optical fibers can be routed from the multi-fiber connectorized pigtail through the housing to the single-fiber connectorized pigtails. The optical fibers can be routed between the exterior side wall and the interior side wall.

Still another aspect of the disclosure can include a telecommunications connection device including a housing and a plurality of multi-fiber connectorized output pigtails that extend outwardly from the housing. The multi-fiber connectorized output pigtails can include output cables and multi-fiber output connectors that can be secured to the free ends of the output cables. Multi-fiber input connectors can be optically coupled to the plurality of multi-fiber connectorized pigtails.

BRIEF DESCRIPTION OF THE DRAWINGS

The accompanying drawings, which are incorporated in and constitute a part of the specification, illustrate several aspects of the present disclosure and together with the description, serve to explain the principles of the disclosure. A brief description of the drawings is as follows:

FIG. 4 is a perspective exploded view of FIG. 2;

FIG. 10 is a cross-sectional view of a multi-fiber optical connector of FIG. 9;

FIG. 11 is a cross-sectional view of a single-fiber optical connector of FIG. 9;

FIG. 14 is another telecommunications connection device in accordance with the principles of the present disclosure;

FIG. 15 is a cross-sectional view of a multi-fiber connectorized pigtail shown in FIG. 14;

FIG. 16 is a cross-sectional view of optical fibers within a multi-fiber connectorized pigtail shown in FIG. 14;

FIG. 18 is an exploded view of FIG. 17;

FIG. 20 is an exploded view of FIG. 19.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like parts.

Figure 1:
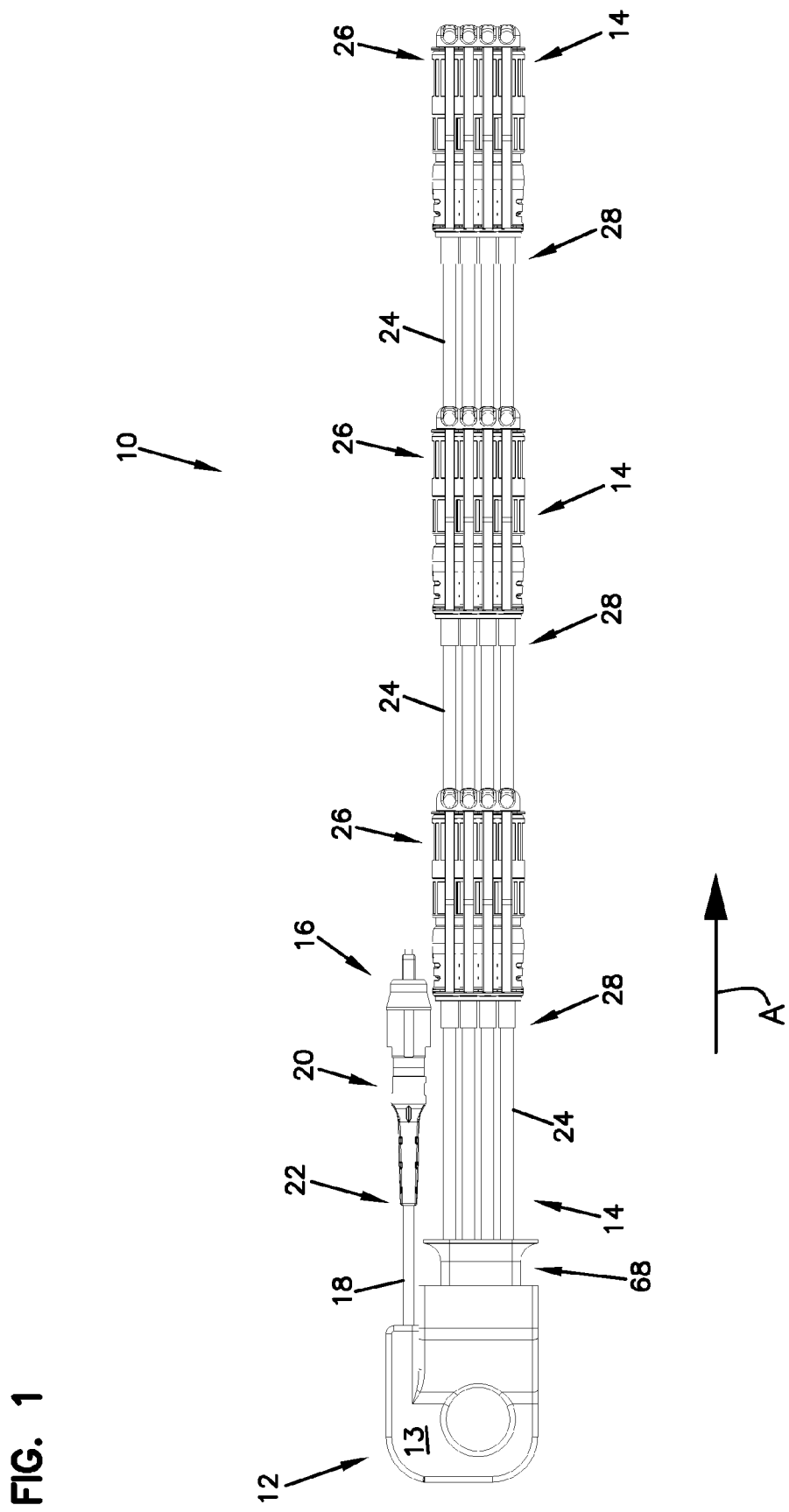
FIG. 1 is a plan view of a telecommunications connection device in accordance with the principles of the present disclosure.

Referring to FIG. 1, a telecommunications connection device 10 includes a housing 12, a plurality of single-fiber connectorized pigtails 14 that extend outwardly from the housing 12 and a multi-fiber connectorized pigtail 16 that extends outwardly from the housing 12. The multi-fiber connectorized pigtail 16 can be optically coupled with the single fiber connectorized pigtail 14. In this example, the single-fiber connectorized pigtails 14 and the multi-fiber connectorized pigtail 16 project outwardly from the housing 12 in a first direction A. The multi-fiber connectorized pigtail 16 can include a first cable 18 and a multi-fiber optical connector 20 secured to a free end 22 of the first cable 18. The single-fiber connectorized pigtails 14 can include second cables 24 and single-fiber optical connectors 26 secured to free ends 28 of the second cables 24. In one aspect of the present disclosure, the second cables 24 can each be more flexible than the first cable 18.

In other examples, the multi-fiber connectorized pigtail 16 can be modified with a single-fiber connector. In this example, the single-fiber connector can include a single fiber that can be routed from the single-fiber connector through the housing 12, the single fiber can be optically connected within the housing 12 to a passive optical power splitter 13, and then the split fiber lines can be separated and routed individually as single-fiber connectorized pigtails.

Figure 2:
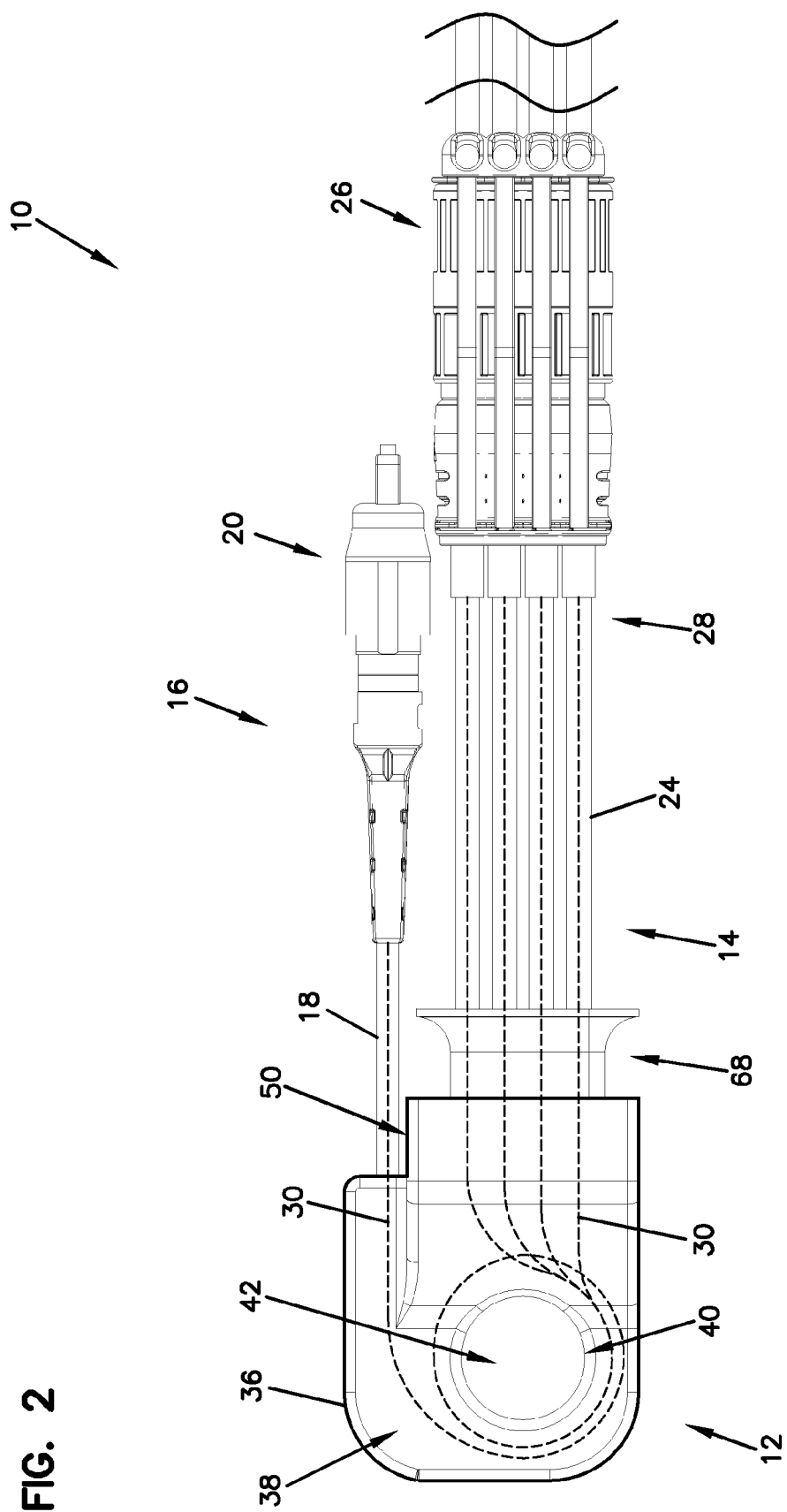
FIG. 2 is an enlarged view of a partial of FIG. 1.

Referring to FIG. 2, multiple optical fibers 30 can be routed from the multi-fiber connectorized pigtail 16 through the housing 12, fanned-out within the housing 12, and then routed individually to the single-fiber connectorized pigtails 14. It is anticipated that the telecommunications connection device 10 may include an equal number of pigtails and connectors for the optical fibers 30. The first cable 18 of the multi-fiber connectorized pigtail 16 can include a twelve fiber ribbon 32 and two strength members 34 each including an epoxy rod reinforced with glass fiber rovings. The strength members 34 can help provide both tensile and compressive reinforcement. In one example, the twelve fiber ribbon 32 can include twelve optical fibers 30 that can be routed from the multi-fiber connectorized pigtail 16 through the housing 12 to the single-fiber connectorized pigtails 14. The twelve optical fibers 30 fan out within the housing 12 into individual pigtails and connectors. In accordance with another aspect of the disclosure, the optical fibers 30 can include optical splices within the housing 12.

Figure 3:
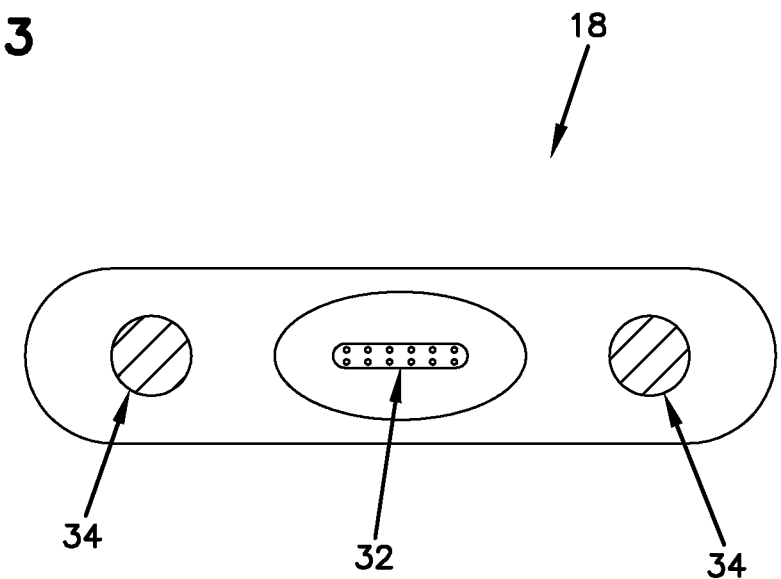
FIG. 3 is a cross-sectional view taken along section line 3-3 of FIG. 10.

Turning to FIG. 3, a cross-sectional view of the first cable 18 is shown. As depicted, the first cable 18 has an elongated transverse cross-sectional profile. It is submitted that the cross-sectional profile of the first cable 18 can vary in other examples.

Referring again to FIG. 2, the housing 12 can have a planform 36 (i.e. outline viewed from above) that can define a planform area 38. The housing 12 can define a through-hole 40 that extends through the housing 12 in a direction transverse to the planform area 38. The through-hole 40 can define a through-hole area 42 that is at least 5 percent as large as the planform area 38. In one aspect, the through-hole area 42 can be at least 10 percent as large as the planform area 38. In another aspect, the through-hole area 42 can be at least 20 percent as large as the planform area 38. In certain examples, a plurality of mounting tabs can project outwardly from the main body of the housing 12. The mounting tabs can define openings for receiving fasteners or other securement structures.

Referring to FIG. 4, the housing 12 can include a major front side 44, a major back side 46, and an exterior side wall 48. The exterior side wall 48 can extend between the major front and back sides 44, 46 and along an exterior boundary 50 (see FIG. 2) defining the planform 36 of the housing 12. The housing 12 can further include an interior side wall 52 that defines the through-hole 40 and extends between the major front and back sides 44, 46. Turning again to FIG. 2, the optical fibers 30 can be routed between the interior side wall 52 defining the through-hole 40 and the exterior side wall 48 of the housing 12. The exterior side wall 48 can define a pigtail opening 54 through which the single-fiber connectorized pigtails 14 are routed. In one aspect, the optical fibers 30 can be routed at least partially about the through-hole 40. In another aspect, the optical fibers 30 can be routed at least 90 degrees about the through-hole 40. In still another aspect, the optical fibers 30 can be routed at least 180 degrees about the through-hole 40. In further aspects, the optical fibers 30 can be routed at least 270 degrees or at least 360 degrees about the through-hole 40.

Figure 5:
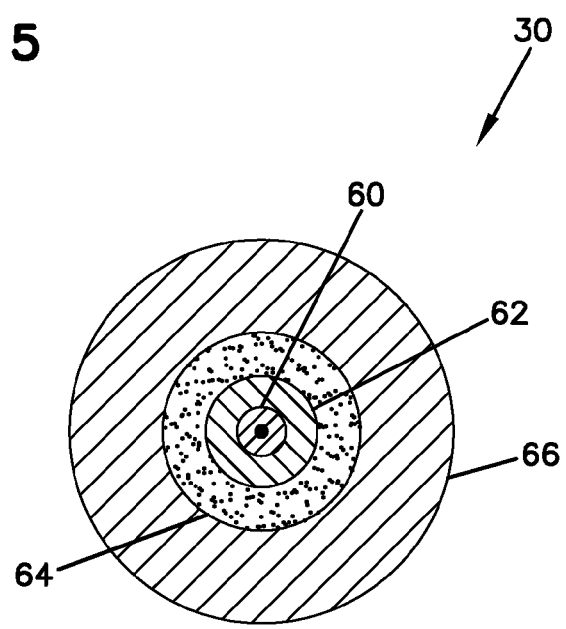
FIG. 5 is a cross-sectional view taken along section line 5-5 of FIG. 11.

Referring to FIG. 5, a cross-sectional view of one of the second cables 24 is shown. The second cables 24 can have round transverse cross-sectional profiles. The second cables 24 of the single-fiber connectorized pigtails 14 can have strength members 34 including aramid yarn. The strength members 34 of the single-fiber connectorized pigtails 14 can provide tensile reinforcement without providing compressive reinforcement. The second cables 24 can include an optical fiber 30 surrounded by keular (i.e. aramid) and a jacket 56. In various aspects, the strength members 34 of the first cable 18 and the strength members 34 of the second cables 24 can be anchored to the housing 12. It is anticipated that the strength members 34 could be anchored to the housing 12 with fasteners, adhesively affixed, or alternatively clamped. In accordance with another aspect of the disclosure, the telecommunications connection device 10 can include a cable anchoring panel 58 positioned adjacent to the pigtail opening 54 for anchoring strength members 34 of the single-fiber connectorized pigtails 14 to the housing 12.

Figure 6:
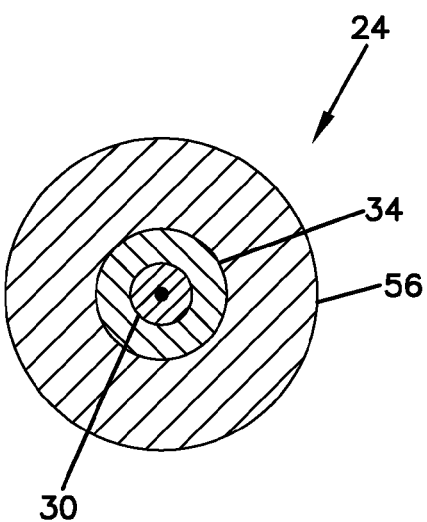
FIG. 6 is an enlarged cross-sectional view of a fiber of FIG. 5.

Referring to FIG. 6, an enlarged view of the optical fiber 30 is depicted. As shown in this example, the optical fiber 30 includes a core region 60 that is surrounded by a cladding region 62 and an outer coating region 64. The optical fiber 30 further includes a buffer region 66. The buffer region 66 can be a loose tube, a tight tube, or a furcation tube. In one example, the furcation tube can be about 900 microns in outer diameter. In certain examples, the fibers can have cores of about 8-12 microns, cladding layers of about 120-130 microns in outer diameter, and coating layers of about 200-260 microns in outer diameter. Bend insensitive fibers can be used in some examples. Other fiber constructions can be used as well.

Turning again to FIG. 4, the telecommunications connection device 10 can include a flexible boot 68 attached to the housing 12 projecting outwardly from the housing 12. The flexible boot 68 can be configured to provide fiber bend radius protection to the single-fiber connectorized pigtails 14 adjacent the pigtail opening 54. In one aspect, the flexible boot 68 can be more flexible than the housing 12. The single-fiber connectorized pigtails 14 can be routed through the flexible boot 68. In this example, the multi-fiber connectorized pigtail 16 is not routed through the flexible boot 68. In one aspect, the single-fiber connectorized pigtails 14 can be more flexible than the multi-fiber connectorized pigtail 16.

Figure 7:
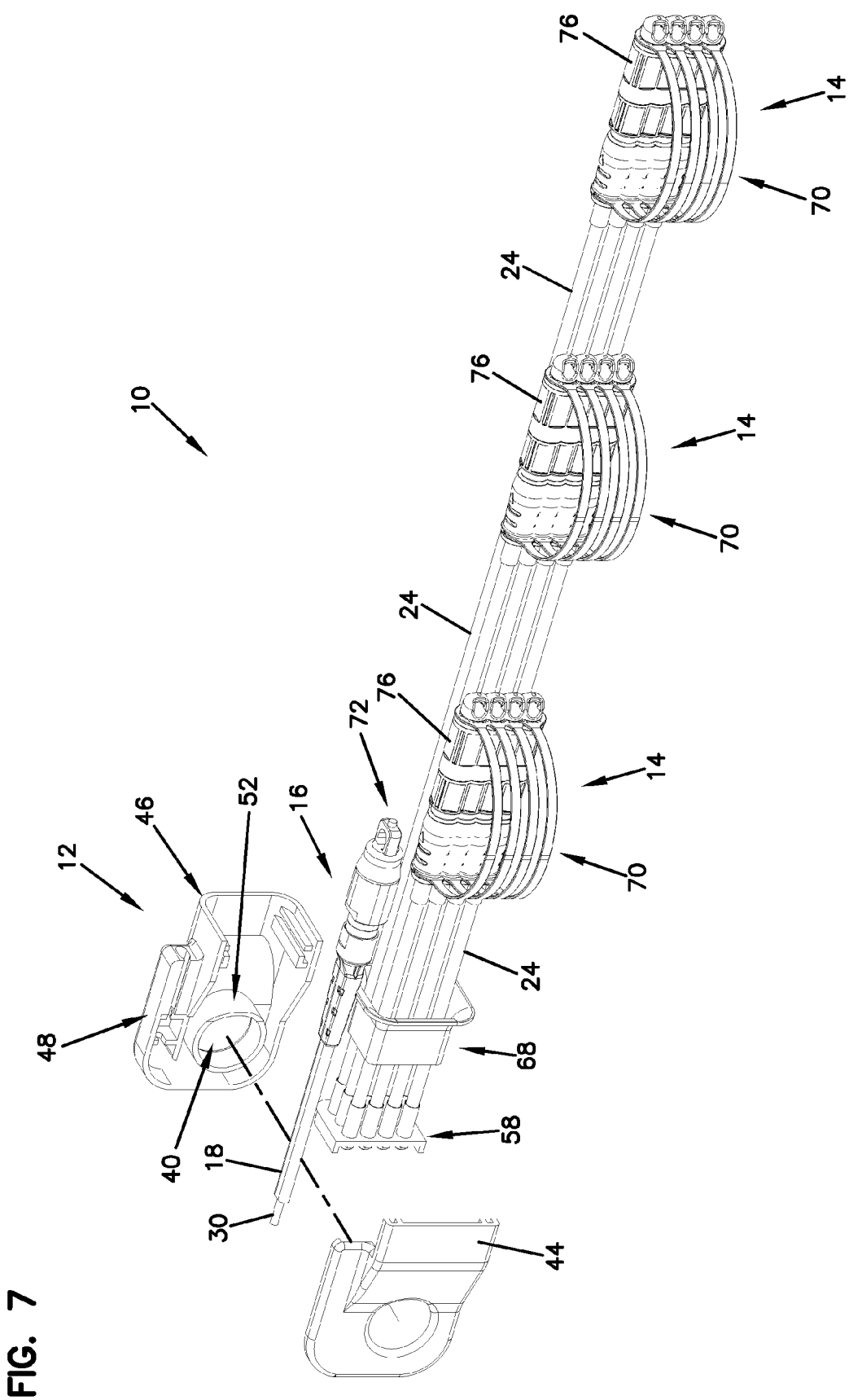
FIG. 7 is a perspective exploded view of FIG. 4 showing stagger connections in accordance with the principles of the present disclosure.
Figure 8:
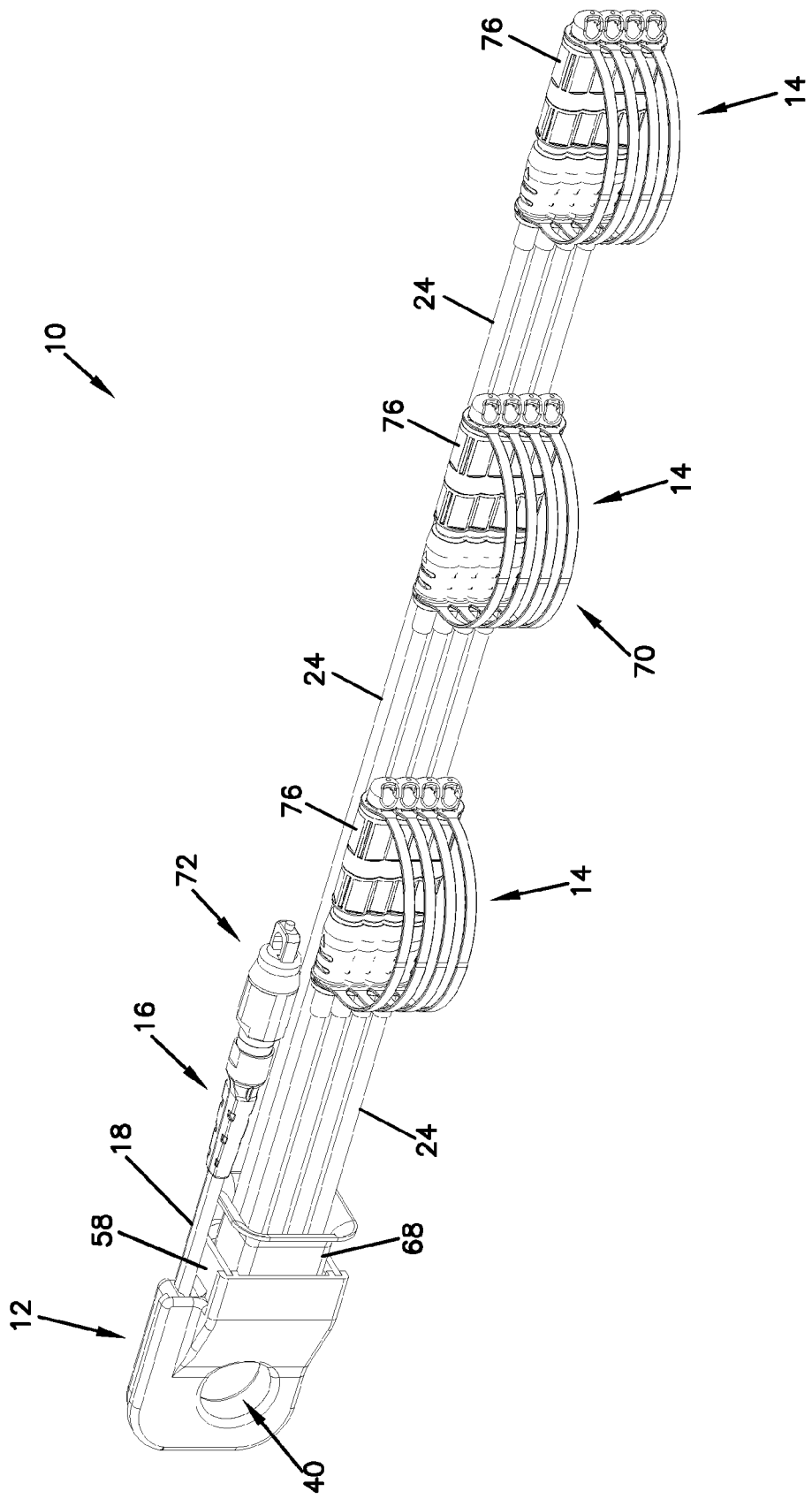
FIG. 8 is a perspective view of FIG. 7.
Figure 9:
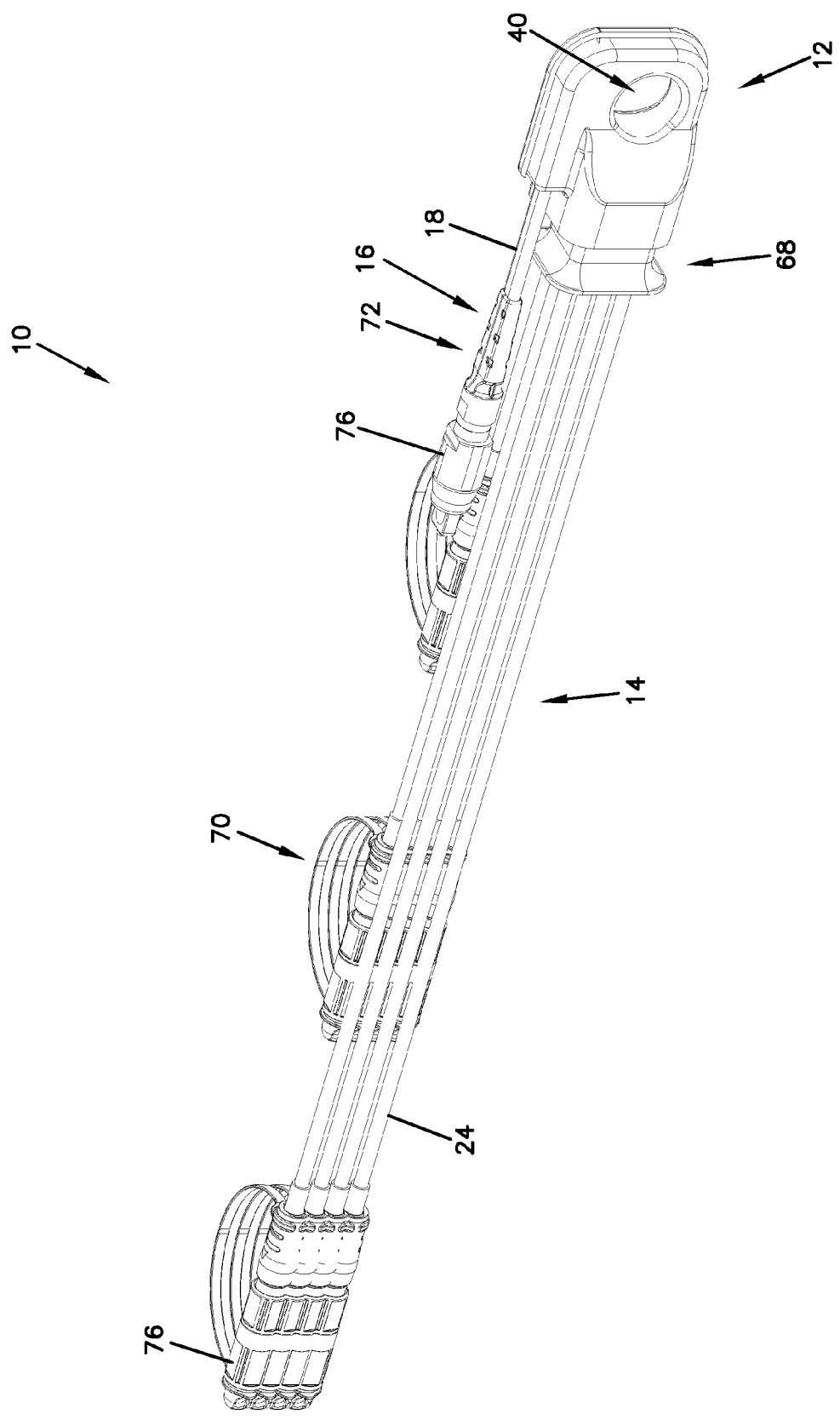
FIG. 9 is a perspective view opposite from the perspective view of FIG. 8.

Referring to FIGS. 7-9, the single-fiber connectorized pigtails 14 can include ruggedized single fiber optical connectors 70 and the multi-fiber connectorized pigtail 16 can include a ruggedized multi-fiber optical connector 72.

Referring to FIG. 11, a cross-sectional view of the connector 70 is shown. The ruggedized single fiber optical connectors 70 can each include coupling nuts 74 and dust caps 76 that attach to the coupling nuts 74 by threaded connections 78. In this example, the dust caps 76 cover interface ends 80 of the ruggedized single-fiber optical connectors 70. The interface ends 80 can include single-fiber ferrules 82 that support end portions 84 of the optical fibers 30. In accordance with another aspect of the disclosure, the coupling nuts 74 can be rotatably mounted on main bodies 86 of the ruggedized single-fiber optical connectors 70. Seals 88 are mounted around the main bodies 86 and engage the dust caps 76 when the dust caps 76 are covering the interface ends 80 of the ruggedized single-fiber optical connectors 70. The dust caps 76 can be removed when it is desired to connect the connectors to another component (e.g., another connector such as a female connector, a fiber optic adapter, or other structure). The coupling nuts 74 are also adapted to mechanically couple the single-fiber optical connectors 70 to structures such as mating connectors, fiber optic adapters, or dust caps. In some examples, the seals 88 form environmental seals 92 with the mating components.

In some examples, the single-fiber optical connectors 70 can be female connectors adapted to couple to corresponding male connectors. In other examples, the single-fiber optical connectors 70 can be male connectors adapted to couple to corresponding female connectors.

Referring to FIG. 10, a cross-sectional view of the connector 72 is shown. The multi-fiber optical connector 72 can include a threaded coupler 90 (e.g., an internally threaded nut) adapted mechanically to couple the multi-fiber optical connector 72 to a structure. In various aspects, the structure can be a mating connector; a fiber optic adapter or a dust cap 91. In some examples, the multi-fiber optical connector 72 can include environmental seals 92.

Figure 12:
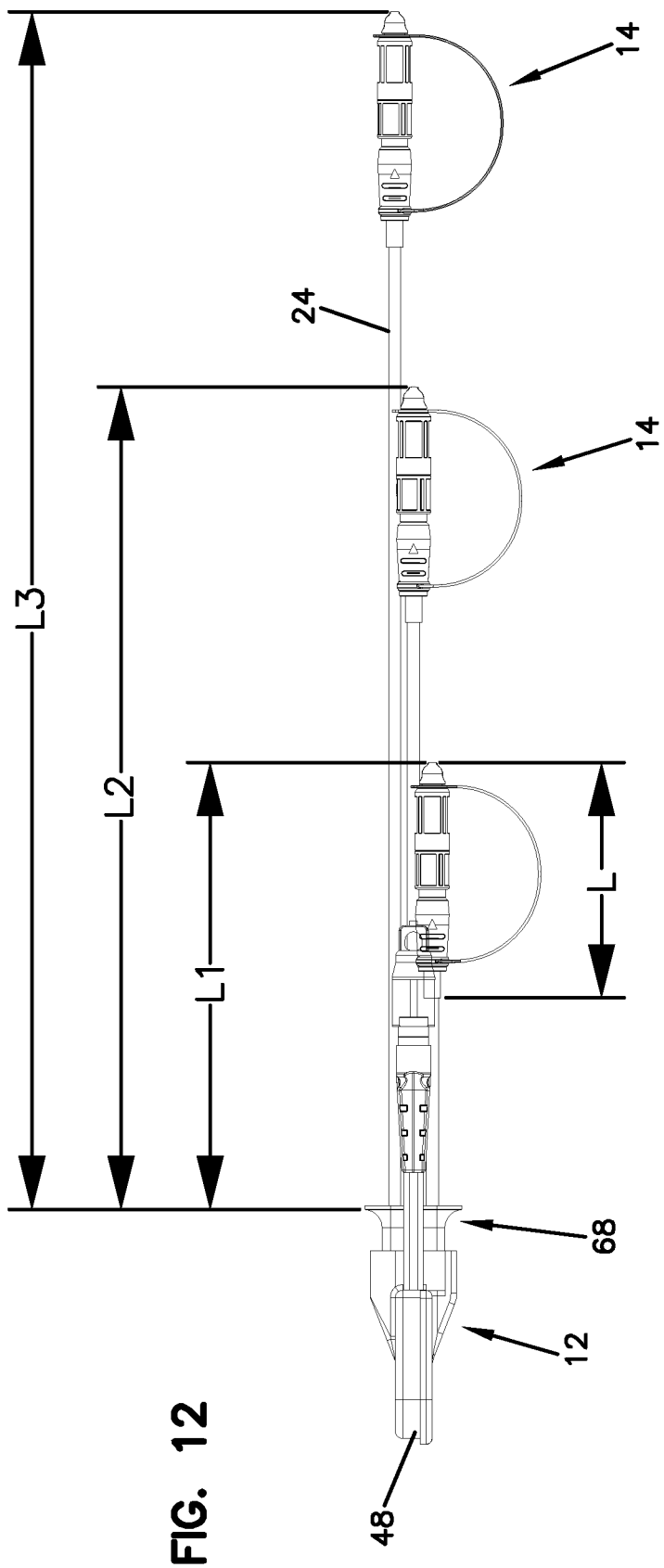
FIG. 12 is a top view of FIG. 1.

Referring to FIG. 12, the single-fiber connectorized pigtails 14 can be longer than the multi-fiber connectorized pigtail 16. As shown, the single-fiber connectorized pigtails 14 have connectorized ends 94 that are staggered relative to one another. The connectorized ends 94 of the single-fiber connectorized pigtails 14 can include the single-fiber optical connectors 26 having connector lengths L. As shown, the single-fiber connectorized pigtails 14 can be arranged with three different lengths L1, L2, and L3 measurable from the a distal end of the flexible boot 68 such that four single-fiber optical connectors 26 fit side-by-side for each length L1, L2, and L3. In accordance with another aspect of the disclosure, the single-fiber connectorized pigtails 14 can be all the same length thereby having no staggering lengths.

Figure 13:
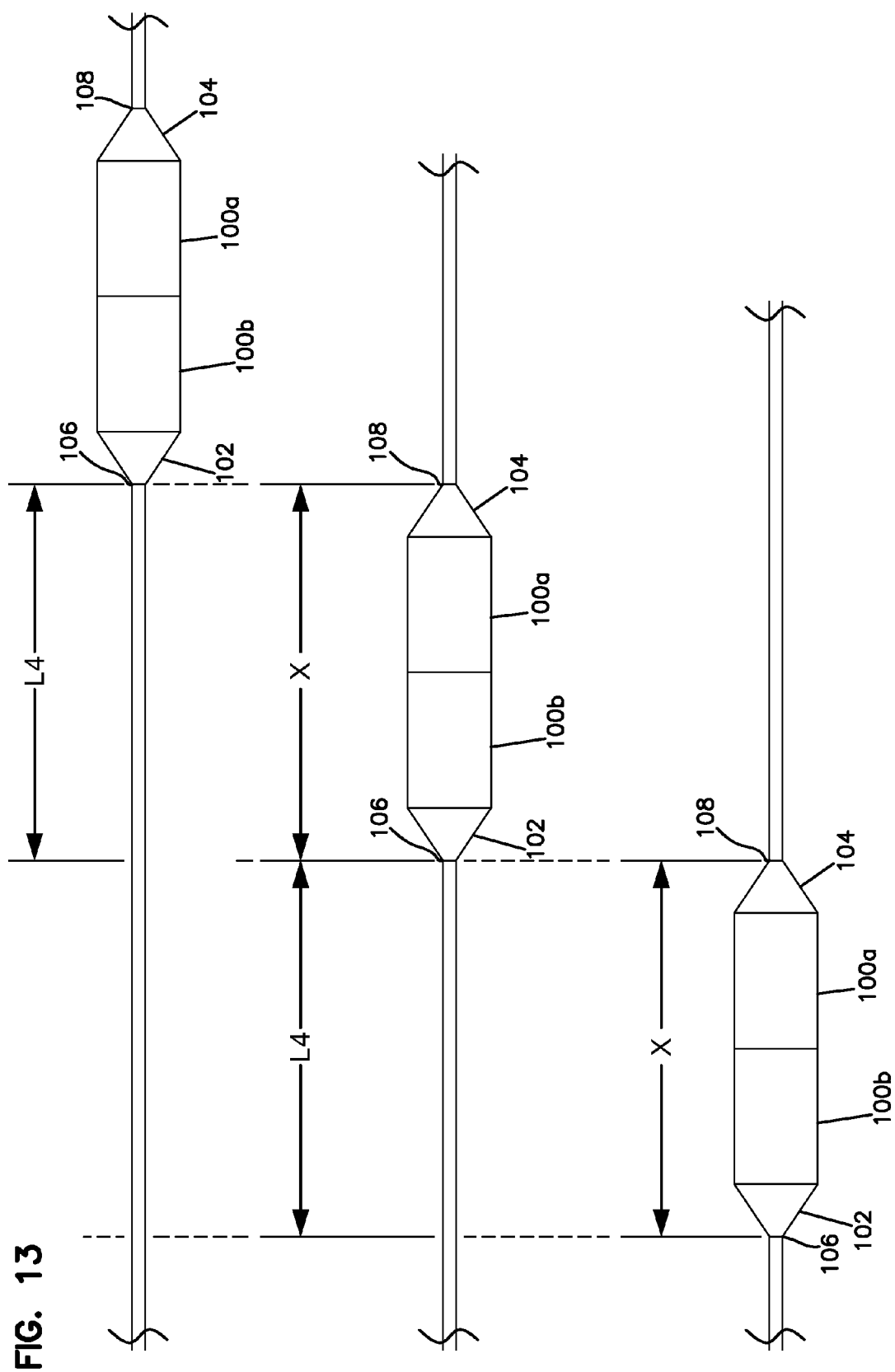
FIG. 13 is a plan view showing staggered mating male and female connections in accordance with the principles of the present disclosure.
Figure 17:
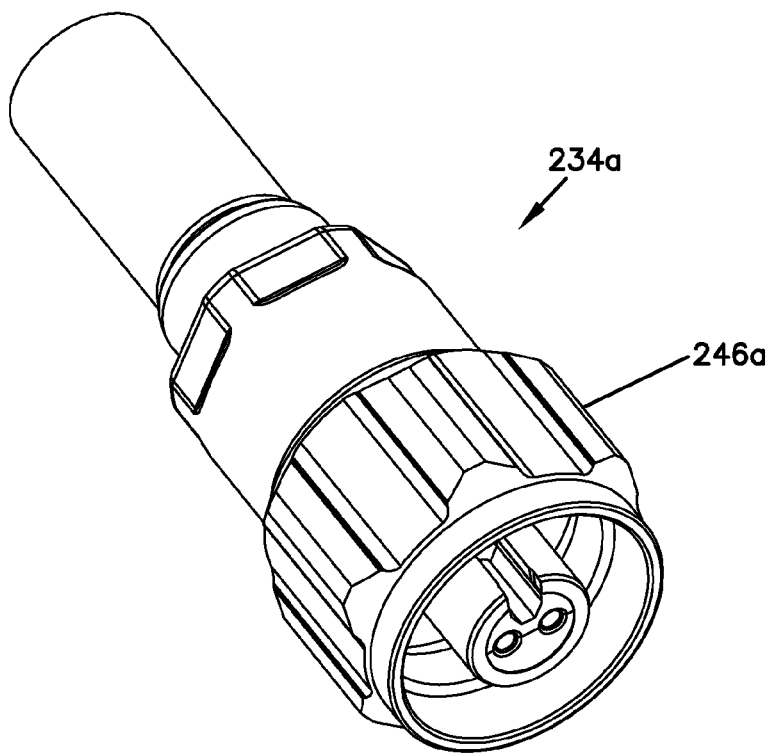
FIG. 17 is an example of a male ODC connector in accordance with the principles of the present disclosure.
Figure 19:
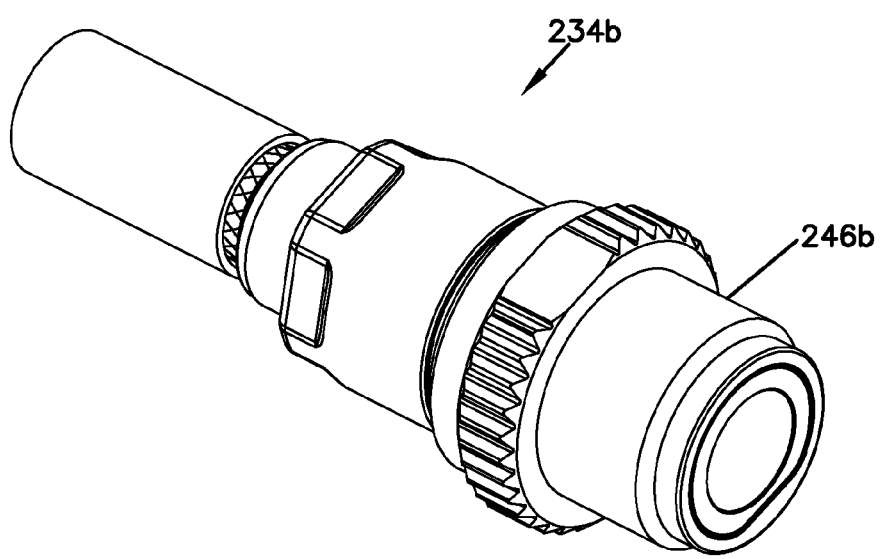
FIG. 19 is an example of a female ODC connector in accordance with the principles of the present disclosure.

Referring to FIG. 13, three mated male and female connectors 100*a*, 100*b* are shown staggered adjacent to one another. The female connector 100*b* can be single fiber connectors mounted at the ends of single fiber connectorized pigtails that are part of a connector device of the type described above. In this example, each of the mated male and female connectors 100*a*, 100*b* includes a first boot 102 and a second boot 104. The first boot 102 can include a first boot tail 106 located at a rear end of the first boot 102. The second boot 104 can include a second boot tail 108 located at a rear end of the second boot 104. As shown in FIG. 13, X is defined as the distance between the first boot tail 106 and the second boot tail 108 of each of the mated male and female connectors 100*a*, 100*b* (e.g., connector length). In this example, a stagger length L4 can be defined as the distance measured from a first boot tail 106 of a mated male and female connector 100*a*, 100*b* having one stagger length to an adjacent first boot tail 106 of another mated male and female connector 100*a*, 100*b* having a different stagger length. In certain examples, the stagger length L4 can be greater than or equal to the distance X of the mated male and female connectors 100*a*, 100*b*.

Referring to FIG. 14, another telecommunications connection device 210 is shown in accordance with the principles of the present disclosure. The connection device 210 can include a plurality of multi-fiber connectorized pigtails 214 (e.g., multi-fiber connectorized output pigtails) that extend outwardly from a housing 212. In some examples, the housing 212 can be referred to as a closure, an enclosure, a terminal, or other structures. In certain examples, the housing 212 can have a flexible construction or alternatively a relatively rigid construction.

The telecommunications connection device 210 can further include a multi-fiber connectorized pigtail 216 (e.g., multi-fiber connectorized input pigtail) having optical fibers that are optically coupled to corresponding optical fibers within the multi-fiber connectorized pigtails 214. While the multi-fiber connectorized pigtails 214 and the multi-fiber connectorized pigtails 216 have been described as "input" and "output" pigtails, it will be appreciated that in use optical signals can be transmitted in both directions through the pigtails. In the depicted example, the multi-fiber connectorized pigtail 216 includes 12 optical fibers. In other examples, the multi-fiber connectorized pigtail 216 can include a greater or lesser number of optical fibers (e.g., two, eight, twelve, twenty-four, thirty-two, etc.).

In certain examples, the optical fibers of the multi-fiber connectorized pigtails 214 can be optically coupled to the optical fibers of the multi-fiber connectorized pigtail 216 at a mass-fusion splice 217 enclosed within the housing 212.

The optical fibers of the multi-fiber connectorized pigtails 214 can be mass-fusion spliced one-to-one with the optical fibers of the multi-fiber connectorized pigtail 216. As shown in FIG. 14, there are six multi-fiber connectorized pigtails 214 each including two optical fibers to yield a total of twelve optical fibers. These twelve optical fibers can be mass-fusion spliced one-to-one with optical fibers within the multi-fiber connectorized pigtail 216.

As shown at FIG. 15, the multi-fiber connectorized pigtail 216 includes a cable having a flat-configuration with a jacket 218 in which two strength members 219 (e.g., fiber reinforced epoxy rods) are imbedded. The multi-fiber connectorized pigtail 216 also includes a fiber ribbon 220 having a plurality of optical fibers 222. In one example, the fiber ribbon 220 includes twelve optical fibers 222 with each of the optical fibers 222 optically coupled to a corresponding optical fiber in one of the multi-fiber connectorized pigtails 214.

In other examples, the multi-fiber connectorized pigtail 216 further includes a multi-fiber connector 224 having a ferrule 226 supporting the ends of the optical fibers 222. In a preferred example, the multi-fiber connector 224 has a ruggedized construction adapted for outdoor use. In certain examples, the fiber optic connector 224 includes a robust fastener such as a threaded coupler or bayonet-style coupler that is used to fasten the fiber optic connector 224 within a corresponding ruggedized port or to a mating ruggedized connector. The strength members 219 of the multi-fiber connectorized pigtail 216 can be anchored (e.g., fastened, adhered or otherwise secured) to the housing 212.

Referring to FIG. 16, the multi-fiber connectorized pigtails 214 each include a jacket 228 containing a plurality of optical fibers 230. In one example, the jackets 228 each contain two of the optical fibers 230. The multi-fiber connectorized pigtails 214 also include cable strength-members 232 (e.g., Aramid yarn) that can be anchored (e.g., fastened, adhered or otherwise secured) to the housing 212. The optical fibers 230 each include a core region 238 surrounded by a cladding layer 240. In certain embodiments, one or more coating layers 242 can surround the cladding layer 240. In one example, the coating layer or layers 242 can include a polymeric material such as acrylate. In still other examples, the coating layer or layers 242 can be surrounded by a buffer layer 244.

In certain examples, the multi-fiber connectorized pigtails 214 can further include multi-fiber connectors 234. In one example, the multi-fiber connectors 234 can include ODC connectors each having two ferrules 236. The ferrules 236 can each support one of the optical fibers 230.

Referring to FIGS. 17-20, a mating male and female ODC connectors 234a, 234b are shown, either of which can be utilized by the multi-fiber connectorized pigtails 214. When connector 234a is mounted on pigtails 214, connector 234b would be mounted on cable or enclosure desired to be coupled to the device 210 and vice versa. The ODC connectors 234a, 234b include robust coupling elements for securely coupling the connectors 234a, 234b together. The coupling elements can include structures such as bayonet-style couplers or threaded couplers. As depicted, connector 234a has an internally threaded collar 246a that threads over an externally threaded end 246b of the connector 234b to secure the connectors 234a, 234b in a mated/connected relationship. Additionally, the connectors 234a, 234b can include one or more seals for sealing the connectors 234a, 234b when the connectors 234a, 234b are secured together.

In certain applications, telecommunications device 210 can be incorporated into a fiber-to-the-antenna network. In such examples, the multi-fiber connectorized pigtails 214 can be optically coupled to tower-mounted remote radio heads or other components within the fiber-to-the-antenna network.

From the forgoing detailed description, it will be evident that modifications and variations can be made without departing from the spirit and scope of the disclosure.

What is claimed is:

1. A telecommunications connection device comprising:
a first ruggedized multi-fiber connector;
a plurality of second ruggedized multi-fiber connectors;
a multi-fiber cable including a plurality of optical fibers, the multi-fiber cable being terminated by the first ruggedized multi-fiber connector, the multi-fiber cable having a flat configuration, the multi-fiber cable having two imbedded strength members, the strength members including fiber reinforced epoxy rods;
a plurality of multi-fiber pigtails, each multi-fiber pigtail including fewer optical fibers than the multi-fiber cable, each multi-fiber pigtail including at least two optical fibers, each of the multi-fiber pigtails being longer than the multi-fiber cable, each of the multi-fiber pigtails being terminated by one of the second ruggedized multi-fiber connectors; and
a breakout housing at which the multi-fiber cable transitions to the multi-fiber pigtails.

2. The telecommunications connection device of claim 1, wherein each of the multi-fiber pigtails includes a jacket containing two optical fibers.

3. The telecommunications connection device of claim 2, wherein each of the multi-fiber pigtails includes cable strength members that are anchored to the housing.

4. The telecommunications connection device of claim 3, wherein the cable strength members of the multi-fiber pigtails include Aramid yarn.

5. The telecommunications connection device of claim 1, wherein each of the multi-fiber pigtails includes a buffer layer surrounding the optical fibers.

6. The telecommunications connection device of claim 1, wherein each of the second ruggedized multi-fiber connectors includes two optical ferrules.

7. The telecommunications connection device of claim 6, wherein the second ruggedized multi-fiber connectors include ODC connectors.

8. The telecommunications connection device of claim 1, wherein the housing has a flexible construction.

9. The telecommunications connection device of claim 1, wherein the housing has a rigid construction.

10. The telecommunications connection device of claim 1, wherein the optical fibers of the multi-fiber pigtails are optically coupled to the optical fibers of the multi-fiber cable at a mass-fusion splice.

11. The telecommunications connection device of claim 1, wherein the plurality of multi-fiber pigtails includes six multi-fiber pigtails.

12. The telecommunications connection device of claim 1, wherein the strength members are anchored to the housing.

13. The telecommunications connection device of claim 1, wherein the optical fibers of the multi-fiber cable are ribbonized.

14. The telecommunications connection device of claim 1, wherein the first multi-fiber connector includes a robust fastener that is used to fasten the first ruggedized multi-fiber connector within a corresponding ruggedized port or to a mating ruggedized connector.

15. The telecommunications connection device of claim 14, wherein the robust fastener includes a threaded coupler.

16. The telecommunications connection device of claim 14, wherein the robust fastener includes a bayonet-style coupler.

17. The telecommunications connection device of claim 1, wherein each of the second multi-fiber connectors includes a robust coupling element.

18. A telecommunications connection device comprising:
a first ruggedized multi-fiber connector;
a plurality of second ruggedized multi-fiber connectors;
a multi-fiber cable including a plurality of optical fibers, the multi-fiber cable being terminated by the first ruggedized multi-fiber connector;
a plurality of multi-fiber pigtails, each multi-fiber pigtail including fewer optical fibers than the multi-fiber cable, each multi-fiber pigtail including at least two optical fibers, each of the multi-fiber pigtails being longer than the multi-fiber cable, each of the multi-fiber pigtails being terminated by one of the second ruggedized multi-fiber connectors; and
a breakout housing at which the multi-fiber cable transitions to the multi-fiber pigtails, wherein the housing has a flexible construction.

19. A telecommunications connection device comprising: a first ruggedized multi-fiber connector; a plurality of second ruggedized multi-fiber connectors; a multi-fiber cable including a plurality of optical fibers, the multi-fiber cable being terminated by the first ruggedized multi-fiber connector; a plurality of multi-fiber pigtails, each multi-fiber pigtail including fewer optical fibers than the multi-fiber cable, each multi-fiber pigtail including at least two optical fibers, each of the multi-fiber pigtails being longer than the multi-fiber cable, each of the multi-fiber pigtails being terminated by one of the second ruggedized multi-fiber connectors, the optical fibers of the multi-fiber pigtails being optically coupled to the optical fibers of the multi-fiber cable at a mass-fusion splice; and a breakout housing at which the multi-fiber cable transitions to the multi-fiber pigtails.

* * * * *